(12) United States Patent
Kato et al.

(10) Patent No.: US 6,206,502 B1
(45) Date of Patent: Mar. 27, 2001

(54) PRINTING METHOD AND PRINTING APPARATUS

(75) Inventors: Minako Kato, Yokohama; Masao Kato; Akira Okamoto, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,993

(22) Filed: Sep. 29, 1999

(30) Foreign Application Priority Data

Sep. 30, 1998 (JP) .................................................. 10-279036

(51) Int. Cl.⁷ .................................. B41J 2/145; B41J 2/15; B41J 29/38
(52) U.S. Cl. .................................................. 347/41; 347/9
(58) Field of Search ................................. 347/43, 41, 42, 347/9; 358/296

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,696,542 | 12/1997 | Matsubara et al. | 347/12 |
| 5,739,828 | 4/1998 | Moriyama et al. | 347/9 |
| 5,929,876 | * 7/1999 | Bartolome | 347/20 |
| 6,067,405 | * 5/2000 | Serra | 358/1.8 |

FOREIGN PATENT DOCUMENTS

| | | |
|---|---|---|
| 54-56847 | 5/1979 | (JP) . |
| 59-123670 | 7/1984 | (JP) . |
| 59-138461 | 8/1984 | (JP) . |
| 60-71260 | 4/1985 | (JP) . |
| 6-143618 | 5/1994 | (JP) . |

* cited by examiner

*Primary Examiner*—Thinh Nguyen
(74) *Attorney, Agent, or Firm*—Fitzpatrick, Cella, Harper & Scinto

(57) ABSTRACT

A printing apparatus and a printing method which eliminate a problem of boundary stripes by taking advantage of features of the multipass printing performed by the printing apparatus without causing a reduction in a throughput. An amount of paper feed for each scan is set to a value which, when multiplied by an integer, is not equal to a printing width covered by a total number of nozzles in a print head, in order to prevent the adjoining of the end portions of print areas of each scan which would otherwise increase the possibility of the boundary stripes being formed at the boundaries and to make the boundaries of the print areas appear at shorter intervals than the paper feed intervals. At the same time, the mask used for the image data to be supplied to the print head in each scan is so set that the mask corresponding to the end nozzle groups among a plurality of nozzle groups have low printing duties.

13 Claims, 14 Drawing Sheets

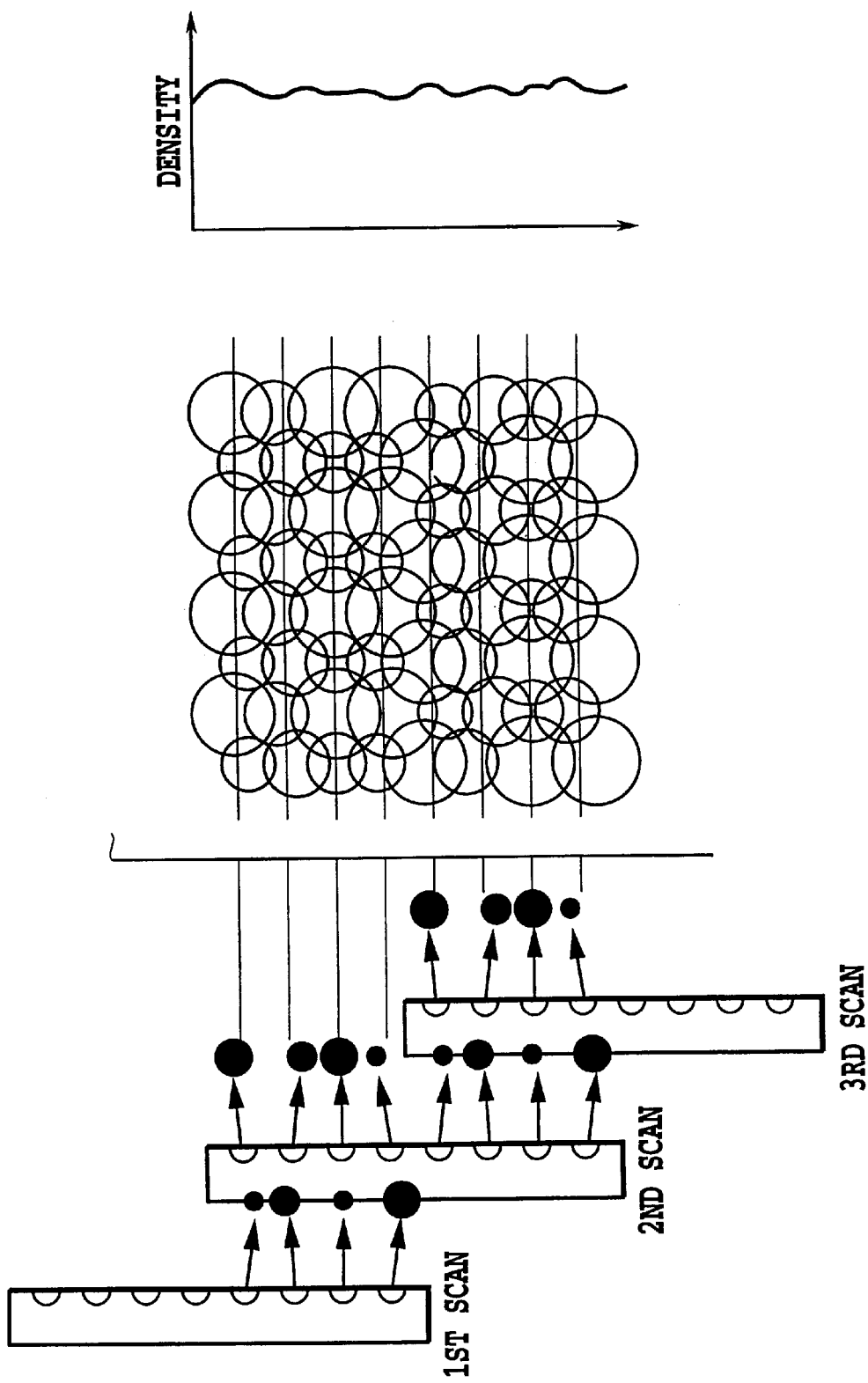

PRINTING METHOD AND PRINTING APPARATUS

BACKGROUND OF THE INVENTION

1. Field of the Invention

The present invention relates to a printing method and a printing apparatus for producing an image on a printing medium and more specifically to a printing method and a printing apparatus used in a case of performing so-called multipass printing.

2. Description of the Related Art

An ink jet printing method, because of its variety of advantages such as low noise, low running cost and ease with which to reduce an apparatus size and to produce color images, has found a wide range of applications as in printers, copying machines and the like. Most of such printing apparatuses employs a print head, which integrates a plurality of printing elements (i.e., nozzles for ejecting ink in a case of an ink jet printing method), to improve the printing speed.

The printing apparatus that uses a print head with the plurality of arrayed printing elements is known to produce a stripe like density variation that appears periodically in a subscan direction (the direction in which the printing medium is fed) and may become one cause of deterioration of printing quality. These periodic stripe like density variations are very conspicuous. Possible causes of these stripe like density variations include, in the case of the ink jet printing system, variations in an amount of ink ejected and an ink ejection direction among nozzles, deviations between paper feed and nozzle pitch, and density variations caused by time variations among each scanning operation.

To reduce the stripe like density variations and improve the print quality, a variety of methods have been disclosed.

For example, Japanese Patent Application Publication No. 59-31949 (1984) discloses a method which eliminates the stripe like density variation (hereinafter, simply referred to "a boundary stripe") that occurs at a boundary (hereinafter, simply referred to "joint") between respective areas, each of which is printed with respective plurality of scans in a main scan direction (hereinafter, simply referred to as "scans"). In the method, pixels at the lower end of the area printed at a previous scan and pixels at an upper end of an area printed at a current scan are overlapped, and then the overlapped pixels are selectively printed with these two times of scans.

A well-known conventional method for realizing further improvement of print quality is a divisional printing method (multipass printing method). The divisional printing method will be explained as follows.

In a case of a print head founded on an ink jet system, the print head with a plurality of nozzles may have a slight manufacturing error among the nozzles during a process of manufacturing the print head. Such error results in variations in the amount of ink ejected and in the ejection direction among the nozzles on printing, which in turn forms the stripe like density variations on a printed image, thus degrading the print quality. One example of such causing of the stripe like density variation is shown in FIGS. 1A–1C. FIG. 1A shows that, in the print head with 8 ink ejection nozzles, the volumes of ink ejected from the nozzles and the ink ejection directions differ from one nozzle to another. If the printing is performed using a head having such ink ejection characteristic variations among nozzles, ink dots formed will vary in a size and a landing position among rasters printed respectively corresponding to respective nozzles, as shown in FIG. 1B. As a result, a blank portion may be formed at a central part of FIG. 1B as shown or conversely a portion may be formed where dots are overlapped more than necessary. FIG. 1C shows a density distribution on an image printed with such dots. These density variations are recognized as the stripe like density variations that may become the cause of deterioration of the print quality.

On the other hand, the divisional printing method (multipass printing method), rather than printing all pixels in a single pass (or in one scan) of the print head in the main scan direction, prints them in a plurality of scans by using different nozzles in different scans.

FIGS. 2A–2C explain the multipass printing that uses the same head as used in the method shown in FIGS. 1A–1C. As shown in FIG. 2A, with respect to the printing area shown in FIG. 1B, three scanning operations of the print head are performed, and then, printing each half of this area, which is covered by four vertically arranged pixels, is completed with two scanning operations. In this case, the eight nozzles of the print head are divided into two groups, i.e., upper four nozzles and lower four nozzles. The dots formed with one nozzle in one scan is what conforms to data obtained by thinning the image data of each half area to approximately one-half according to a predetermined method. Then, by feeding a paper at a distance corresponding to four pixels, nozzles different from those used for the first printing face the same printing position and complementarily form dots according to the remaining half thinned data, thus completing the printing. According to this printing method, since one raster (one line of dots in a main scan direction) is printed with inks ejected from different nozzles (in the example shown, two different nozzles), the influence of variations among nozzles can be alleviated and the density variations can be reduced as shown in FIGS. 2B and 2C.

This divisional printing method divides image data so that respective image data for the first and second scans are extracted according to respective predetermined rules and the extracted data complement each other. Generally, the extraction is performed using mask processing and a most popular mask is a checker pattern mask where the data is extracted vertically and horizontally at every other pixels like a checker pattern as shown in FIGS. 3A–3C. In a unit printing area (in this case, a 4-pixel unit area), the printing is completed with two scans (2 passes), where at the first scan, a checker pattern as shown in FIG. 3A is printed, and at the second scan, an inverse checker pattern as shown in FIG. 3B is printed.

In the multipass printing method described above, increasing a number of divisions (passes) is effective in further improving the print quality. For example, when a 2-pass printing and a 10-pass printing are compared, the 2-pass printing completes one raster by using two different nozzles whereas the 10-pass printing completes the same raster by using 10 different nozzles. Hence, the degree to which the printed result is affected by the ejection characteristic variations among nozzles is relatively smaller in the 10-pass printing than in the 2-pass printing, and then the overall influence of the characteristic variations on the print quality becomes smaller in the 10-pass printing to that extent. As a result, the stripe like density variations is made inconspicuous.

Regarding the multipass printing method described above, Japanese Patent Application Laid-Open No. 6-143618 (1994) discloses a method which considers a fact that a total numbers of scans applied for completing printing of both side areas of the joint or the boundary portion are greater than the number of scans required to complete printing in other areas, and reduces the print duty in both side areas of the boundary portion, particularly when a printing medium that quickly absorbs ink is used to improve the print quality of the multipass printing method.

In any of the multipass printing methods described above, when there is a discrepancy between the paper feed amount and the nozzle pitch of the print head, the so-called boundary stripe is unavoidably produced. This phenomenon will be explained by referring to FIGS. 4A and 4B.

FIGS. 4A and 4B represent examples of the 2-division printing (2-pass printing) for a case where an 8-nozzle head is used as in FIGS. 3A–3C. For simplicity of explanation, it is assumed that the head has no ejection characteristic variations among these 8 nozzles. Further, the mask used for the division printing is checker pattern mask. That is, during odd-numbered scan the checker pattern mask is used and, during even-numbered scan the inverse checker mask is used, so as to complete the printing in each divided area with a combination of these two different kinds of scans.

FIG. 4A shows a result of printing when the paper is fed at a distance exactly corresponding to four pixels in each of the two paper feed operations. For simplicity, only dots printed during the first and third scans are shown at a right of the drawing and the dots printed during the second scan is not shown. A lower end portion of the area printed at the first scan adjoins an upper end portion of the area printed at the third scan, and the boundary between these areas constitutes the joint between both areas printed during respective scans. As shown in FIG. 4A, when the paper is fed at the distance exactly corresponding to eight pixels in two paper feed operations, the printed dots at the joint between the areas of the scans are arranged correctly and no boundary stripe is formed.

On the other hand, FIG. 4B shows a result of printing that is performed when the paper feed amount is greater than the required four-pixel distance. As similar to FIG. 4A, at the right of the drawing, only the dots printed at the first and third scans are shown. The paper is fed two times from the first to the third scan and because each paper feed amount is greater than the distance corresponding to four pixels, the paper is fed at a distance greater than eight pixels between the first scan and the third scans. Thus, a group of dots printed at the third scan is spaced from the group of dots printed at the first scan by a distance corresponding to the paper feed amount error. This space or gap between the areas of the scans is recognized as a white boundary stripe on a printed image, which deteriorates the printed quality.

It should be noted that conversely, when the paper feed amount is smaller than the required distance so that the paper feed error appears as a minus amount, the gap is recognized as a black boundary stripe. Further, although the above phenomenon is explained based only on the paper feed errors assuming that there are no errors in the pitch among nozzle groups, there may be cases where the overall nozzle pitch is larger or smaller than a normal nozzle pitch. In these cases, the black or white boundary stripes may appear, respectively.

Moreover, even when a paper feed error averaged over the entire printing medium is zero, if there is any two times of paper feed whose total feed amount is larger or smaller than the distance corresponding to eight pixels in paper feeds for the entire printing, the same phenomenon as described above may occur at the boundary between the areas of the two times of scans. The amount of paper feed may vary depending on errors of the outer diameter of paper feed rollers, the environment in which the printing is performed, and the kind and state of the printing medium such as paper. It is therefore difficult to totally eliminate errors produced at every feeding operation.

As described above, the boundary stripe at boundaries or joints may occur also in the multipass printing system. Increasing the number of passes is conducive to alleviating the boundary stripes. Because an increase in the number of passes decreases the number of dots printed at one scan, the boundary stripes, even if produced owing to the paper feed errors, decrease in density.

The degree to which the boundary stripes are conspicuous to the human eye depends upon a spatial frequency of the stripe like density variations. More specifically, stripes of the same density may or may not become noticeable depending on their intervals.

This characteristic is shown in a graph of FIG. 5, in which an ordinate axis represents an intensity of sensitivity and an abscissa axis represents a spatial frequency (cycles/mm). As can be seen from the figure, the spatial frequency realizing the highest sensitivity exists around 1.1 cycles/mm, which means that the stripes at 0.9 mm intervals show most conspicuously. When a print head with 8 nozzles arranged at 600 dpi pitch is used, the interval at which the stripes are produced at the multipass printing is as follows. In comparing between respective printed images produced in the 2-pass printing and the 10-pass printing, the 2-pass printing feeds the paper at a distance corresponding to a 40 nozzle pitch and the interval of the stripe occurrence is a 40 nozzle pitch, which is equal to 1.69 mm (25.4 mm/600 dpix40 pixels). In other words, the spatial frequency is 0.59 cycles/mm. On the other hand, in the 10-pass printing, the paper is fed at a distance corresponding to 8 nozzles and the interval of stripe occurrence is an 8-nozzle pitch, which is equal to 0.338 mm (25.4 mm/600 dpix8 pixels). Thus the spatial frequency is 3.0 cycles/mm. FIG. 5 apparently shows that the interval of stripe occurrence in the 10-pass printing is less conspicuous than that in the 2-pass printing.

However, increasing the number of passes reduces the print area to be completed in one pass or one scan, which in turn increases a time required to print the entire image. For example, increasing the number of passes from the 2-pass printing to the 10-pass printing increases the printing time by five times, based on simple calculation.

SUMMARY OF THE INVENTION

An object of the present invention is to provide a printing apparatus and a printing method which can eliminate a problem caused by boundary stripes without causing a reduction in a throughput of the apparatus and realize an improved print quality by taking advantage of a features of multipass printing described above.

In the first aspect of the present invention, there is provided a printing apparatus for performing printing on a printing medium using a print head arrayed with a plurality of printing elements, the apparatus comprising:

scanning means for moving the print head and the printing medium relative to each other to scan the print head to the printing medium;

paper feed means for moving the print head and the printing medium relative to each other to feed the printing medium in a direction different from a scan direction of the print head;

multipass control means for controlling the scanning means and the paper feed means to scan the print head a plurality of times between which feeding the printing medium by the paper feed means is performed, so that different printing elements of the print head are made to correspond to a same print area of the printing medium at the plurality times of scans to print the print area and printing for areas are completed successively for each scan of the plurality of scans; and mask means for performing mask processing to generate image data used for control of printing by the multipass control means, the mask processing being performed so that a printing duty for an end group of the printing elements in an arrangement of a plurality of groups of the printing elements, which are made to correspond to one of the areas of which printing is completed successively for each scan of the plurality of scans, is made smaller than that of other groups of the plurality of groups.

Here, a feed amount at which the printing medium is fed by the paper feed means may be an amount not equal to a divisor of a printing width covered by a total number of printing elements of the print head.

In the second aspect of the present invention, there is provided a printing method of performing printing on a printing medium using a print head arrayed with a plurality of printing elements, the method comprising the steps of:

providing scanning means for moving the print head and the printing medium relative to each other to scan the print head to the printing medium, and paper feed means for moving the print head and the printing medium relative to each other to feed the printing medium in a direction different from a scan direction of the print head;

controlling the scanning means and the paper feed means to scan the print head a plurality of times between which feeding the printing medium by the paper feed means is performed, so that different printing elements of the print head are made to correspond to a same print area of the printing medium at the plurality times of scans to print the print area and printing for areas are completed successively for each scan of the plurality of scans; and performing mask processing to generate image data used for control of printing by the step for controlling the scanning means and the paper feed means, the mask processing being performed so that a printing duty for an end group of the printing elements in an arrangement of a plurality of groups of the printing elements, which are made to correspond to one of the areas of which printing is completed successively for each scan of the plurality of scans, is made smaller than that of other groups of the plurality of groups.

Here, a feed amount at which the printing medium is fed by the paper feed means may be an amount not equal to a divisor of a printing width covered by a total number of printing elements of the print head.

According to an above configuration, in printing respective areas whose printing operations are completed sequentially at every respective scan, although an end group of printing elements in the print head adjoins an area so as to print the area in a certain scan and therefore a boundary between the area and a adjacent area is defined during that scan, so that a boundary stripe is likely to occur, the mask processing is performed to reduce a printing duty for the area adjoining the boundary so that a density of the boundary stripe, even if it should occur, can be reduced. Further, a paper feed amount is set to a width not equal to a divisor of a printing width corresponding to a total number of the printing elements so that the end portions of the areas printed at each scan can be prevented from adjoining each other at the boundary. This can eliminate a major cause for the boundary stripes and, even if one end portion of the area results in the formation of the boundary stripe, it is possible to make the stripe occurrence interval smaller than the paper feed width.

In the third aspect of the present invention, there is provided a printing apparatus for performing printing on a printing medium using a print head arrayed with a plurality of printing elements, the apparatus comprising:

scanning means for moving the print head and the printing medium relative to each other to scan the print head to the printing medium;

paper feed means for moving the print head and the printing medium relative to each other to feed the printing medium in a direction different from a scan direction of the print head;

multipass control means for controlling the scanning means and the paper feed means to scan the print head a plurality of times between which feeding the printing medium by the paper feed means is performed, so that different printing elements of the print head are made to correspond to a same print area of the printing medium at the plurality times of scans to print the print area and printing for areas are completed successively for each scan of the plurality of scans; and mask means for performing mask processing to generate image data used for control of printing by the multipass control means, the mask processing being performed so that a printing duty for a part of a group of the printing elements other than an end group in an arrangement of a plurality of groups of the printing elements, which are made to correspond to one of the areas of which printing is completed successively for each scan of the plurality of scans, is made zero.

In the fourth aspect of the present invention, there is provided a printing method of performing printing on a printing medium using a print head arrayed with a plurality of printing elements, the method comprising the steps of:

providing scanning means for moving the print head and the printing medium relative to each other to scan the print head to the printing medium, and paper feed means for moving the print head and the printing medium relative to each other to feed the printing medium in a direction different from a scan direction of the print head;

controlling the scanning means and the paper feed means to scan the print head a plurality of times between which feeding the printing medium by the paper feed means is performed, so that different printing elements of the print head are made correspond to a same print area of the printing medium at the plurality times of scans to print the print area and printing for areas are completed successively for each scan of the plurality of scans; and performing mask processing to generate image data used for control of printing by the step for controlling the scanning means and the paper feed means, the mask processing being performed so that a printing duty for a part of a group of the printing elements other than an end group in an arrangement of a plurality of groups of the printing elements, which are made correspond to one of the areas of which printing is completed successively for each scan of the plurality of scans, is made zero.

According to the above configuration, it is possible to make the boundary stripes themselves inconspicuous and make the intervals of the stripes smaller than the paper feed amount.

The above and other objects, effects, features and advantages of the present invention will become more apparent from the following description of embodiments thereof taken in conjunction with the accompanying drawings.

BRIEF DESCRIPTION OF THE DRAWINGS

FIGS. 2A, 2B and 2C are diagrams explaining multipass printing (divisional printing);

DETAILED DESCRIPTION OF THE PREFERRED EMBODIMENTS

Embodiments of the present invention will be described by referring to the accompanying drawings.

Figure 6:
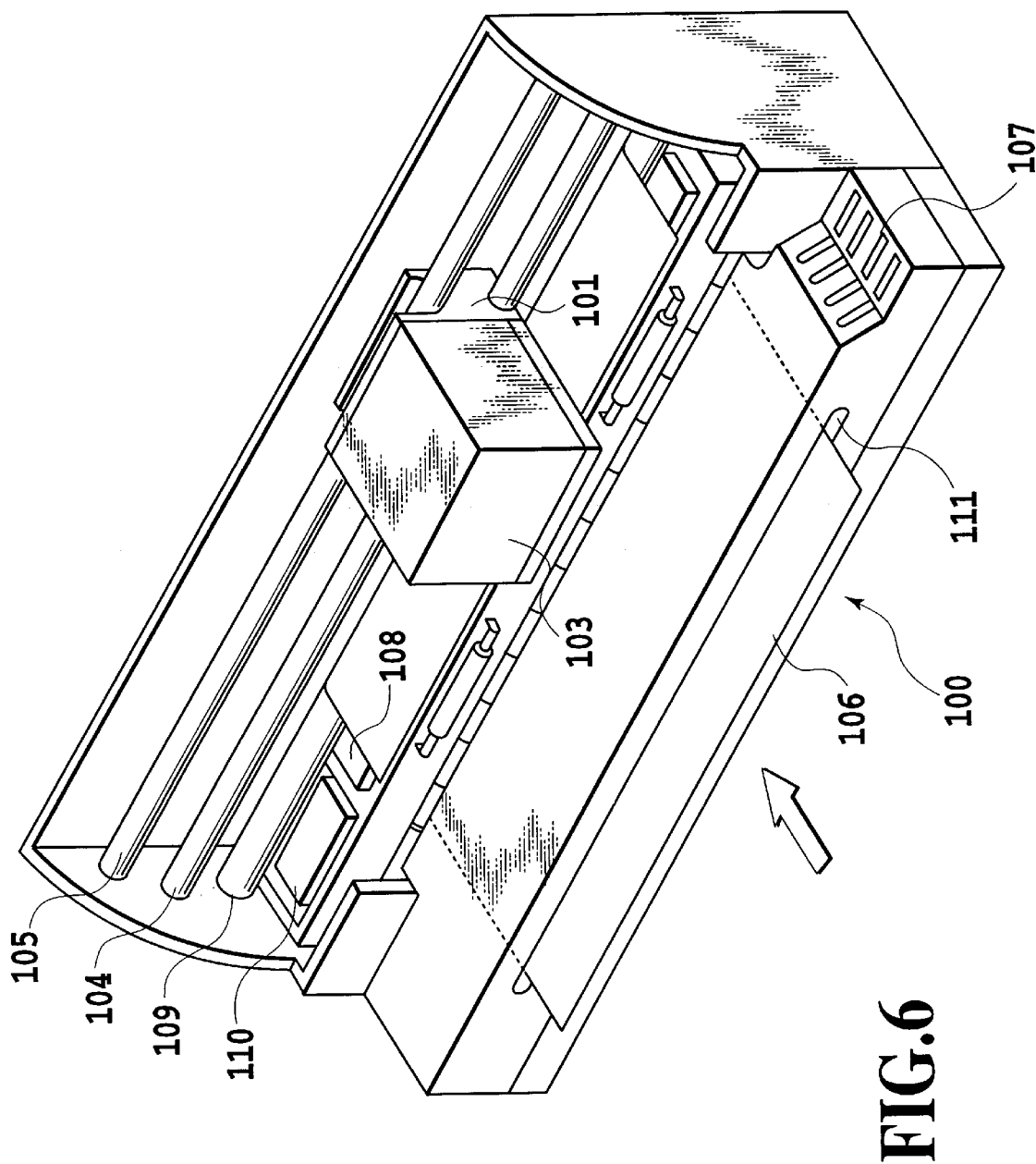
FIG. 6 is a perspective view showing a printing apparatus to which the present invention can be applied.

FIG. 6 is a general perspective view showing one example of an ink jet printing apparatus to which the present invention is applicable. A printing medium 106 inserted into the feed position of a printing apparatus 100 is fed by a feed roller 109 to a printing area of a print head unit 103. A platen 108 is provided under the printing medium in the printing area. A carriage 101 slidably engages two guide shafts, a guide shaft a 104 and a guide shaft b 105, and can be slid along these guide shafts. The carriage 101 can be reciprocally driven by a drive mechanism not shown to scan the print head unit to the printing area. The carriage 101 mounts the print head unit 103 which includes a plurality of print heads for ejecting different colors of inks and ink tanks for supplying inks to the associated print heads. The ink colors used by the ink jet printer of this example are four colors: black (Bk), cyan (C), magenta (M) and yellow (Y), as will be mentioned in FIG. 7.

Below a left side of a range in which the carriage can be moved is installed an ejection recovery unit 110 which is used to cover the nozzles of the print head while not printing. This left end position is called a home position of the print head.

Reference numeral 107 denotes a switch portion and display element portion. The switch portion is used to turn on or off a power of the printing apparatus and to set a variety of printing modes, and the display element portion displays a variety of states of the printing apparatus.

Figure 7:
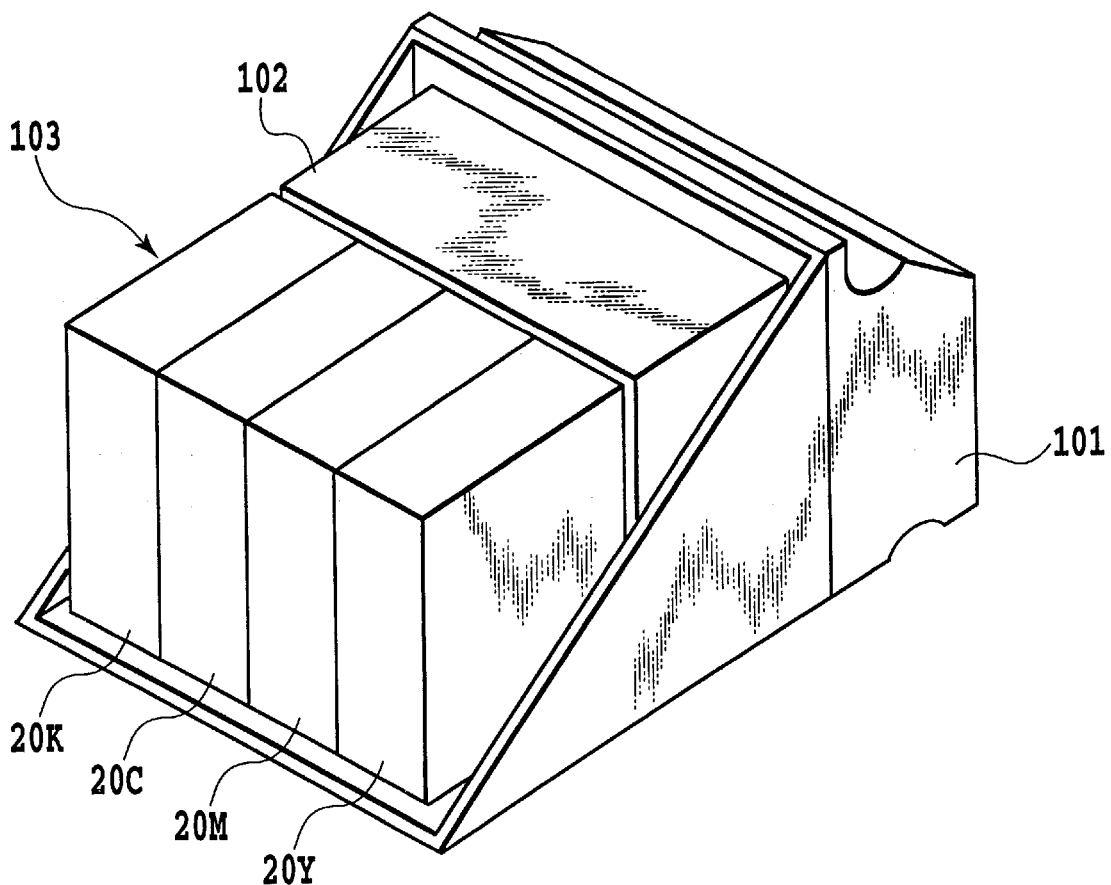
FIG. 7 is a perspective view showing a print head unit used in the printing apparatus shown in FIG. 6.

FIG. 7 is a perspective view showing a generic construction of the print head unit 103. The carriage 101 mounts respective print heads 102 for ejecting black, cyan, magenta and yellow inks, respectively and a black ink tank 20K, a cyan ink tank 20C, a magenta ink tank 20M and a yellow ink tank 20Y. The tanks are connected to the print heads through connection portions and supply inks to the corresponding print heads. The print heads and the ink tanks are adapted to be removably mounted on the carriage, individually.

All of these four color ink tanks may be integrally formed, or three color ink tanks except for the black ink tank may be integrally formed. Further, in order to use different densities of the same ink color for improved print quality, it is also possible to provide additional printing heads and ink tanks.

Figure 8:
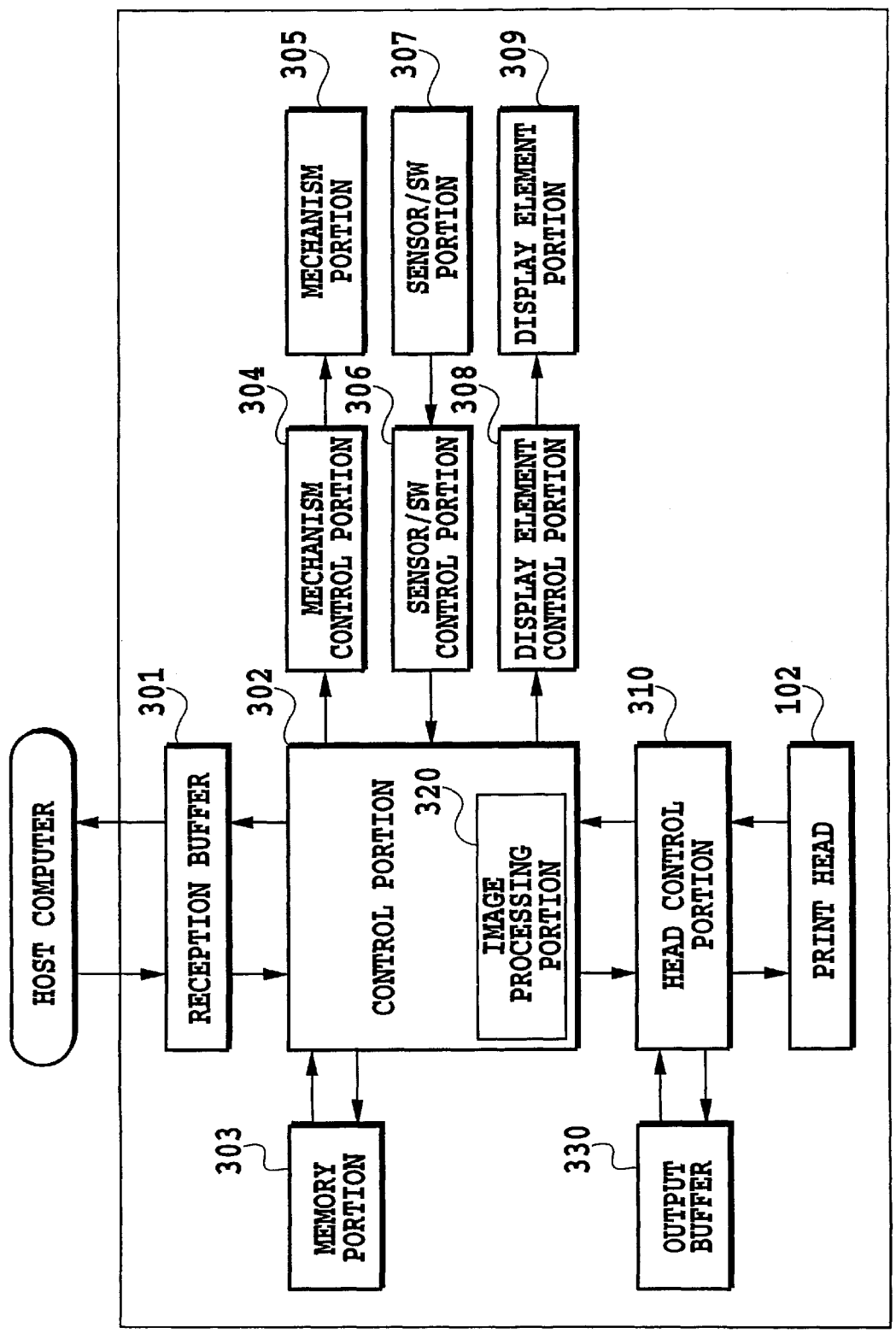
FIG. 8 is a block diagram mainly showing a control circuit structure in the printing apparatus.

FIG. 8 is a block diagram showing mainly a control structure in the ink jet printing apparatus according to this embodiment.

Data of characters and images (hereinafter referred to as "image data") to be printed which is sent from a host computer is temporarily stored in a reception buffer 301. Data indicating whether or not the image data is being transferred correctly and data representing an operating state of the printing apparatus are returned from the printing apparatus to the host computer. The data stored in the reception buffer 301 is transferred, under the control of a control portion 302 having a CPU, to a RAM (random access memory) of a memory portion 303 where the data is stored temporarily.

A mechanism control portion 304, based on a command from the control portion 302, controls a drive operation of a mechanism portion 305 which includes carriage motor and line feed motor to perform such operations as scanning of the print head and a feeding of a printing medium, which will be explained referring to FIG. 9 and subsequent figures. A sensor/SW control portion 306 sends a signal from a sensor/SW portion 307, which includes various sensors and switches (SW), to the control portion 302. A display element control portion 308 controls the display element portion 309, which comprises LEDs of display panels and liquid crystal display elements, based on a command from the control portion 302. A print head control portion 310 controls, based on a command from the control portion 302, an operation of the print head 102 for ink ejection which includes the supply of image data for each scan that will be explained in FIG. 9 and subsequent figures. In connection with this operation, an image processing portion 320 performs a predetermined image processing for the image data sent from the host computer to generate image data for driving the print head 102 and also performs a mask processing to be described in FIG. 9 and subsequent figures. Information on a state of the print head 102, such as temperature, is detected and sent to the control portion 302.

A printing method performed by the above ink jet printing apparatus as one embodiment of the present invention will be described bellow.

(Embodiment 1)

A first embodiment of the present invention describes a printing method in which the nozzles of the print head are divided into three nozzle groups, respective print duties of areas printed by means of both end nozzle groups are reduced in each scan, and the paper is fed at a distance corresponding to the number of nozzles which is not a divisor of a total number of the nozzles of the print head, thereby reducing a boundary stripe.

Figure 9A:
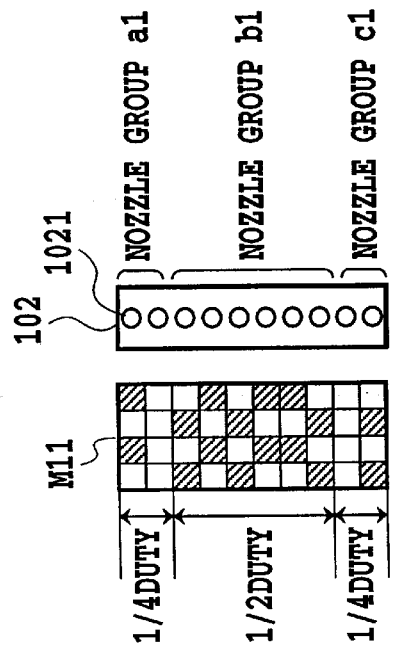
FIGS. 9A and 9B are explanatory diagrams showing masks used in the multipass printing according to a first embodiment of the present invention and a process in which the multipass printing is completed.
Figure 9B:
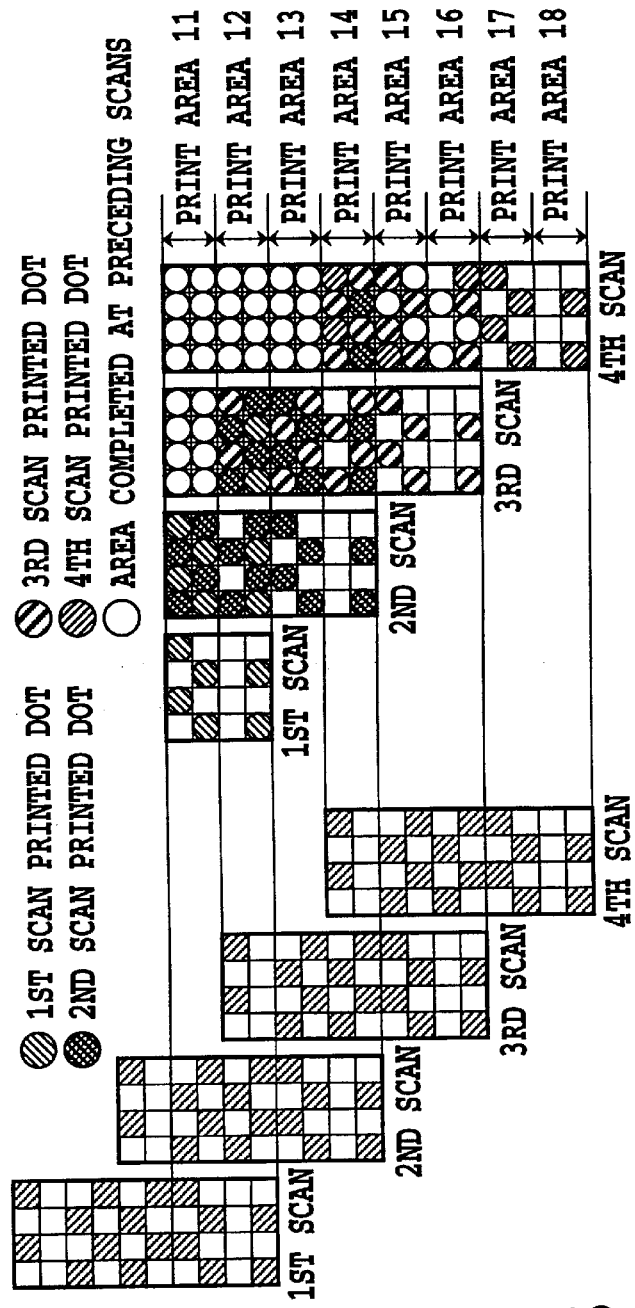

FIGS. 9A and 9B are explanatory diagrams showing a printing process using a thinning mask in this embodiment.

FIG. 9A is a diagram schematically showing the print head 102 having 1 nozzles 1021 and a mask M11 used correspondingly to this head. The number of nozzles is set to 10 for the simplicity of explanation and it should be noted that the application of this invention is not limited to this configuration. A size of the mask M11, which is expressed by a number of pixels as a unit correspondingly to the image data expressed for each pixel, is 10 vertically arranged pixels by four horizontally arranged pixels. The portions of the mask M11 shown in gray in the figure represent the portions where the image data is made valid. That is, the mask processing in this embodiment is performed on the image data for one scanning operation of the print head 102. Hence, the mask M11 has a size that matches 10 vertically arranged pixels corresponding to the number of nozzles of the head and is repetitively used at a 4-pixel interval in the scan direction of the image data. Ten nozzles 1021 are divided into three nozzle groups (nozzle groups a1, b1, c1) and the mask M11 corresponding to these nozzles is also divided into three areas as shown in the figure. Areas of the mask corresponding to the two nozzles in both end nozzle groups a1 and c1 make valid two out of the eight pixels of image data. This is called a ¼ duty or 25% duty. An area of the mask corresponding to the central six nozzles in the nozzle group b1 makes 12 out of 24 of image data valid. This is called a ½ duty or 50% duty. In each scan, as shown in FIG. 9B, the same mask portions always correspond to the same nozzles. In other words, the mask is constructed so that its areas corresponding to the nozzle groups complementarily make up the portions that render the image data valid in two or three scans. An actual construction of the mask is determined by the mask data as is broadly known, and the portions that make the image data valid are those having mask data of, for example, "1" which is provided for an AND process with the image data.

FIG. 9B is a diagram showing a process in which the printing method of this embodiment completes an image using the print head and the mask M11 shown in FIG. 9A. In the example shown, it is assumed for simplicity of explanation that a final image to be produced is a solid rectangle in which all pixels arranged in an array, 4 or more horizontal dots by 16 or more vertical dots, are printed. A paper feed amount corresponds to a four-nozzle width (in this specification, the "nozzle width" represents a nozzle pitch). The total number of nozzles used in the head is 10 nozzles; therefore, the paper feed amount is set to a nozzle width which is not a divisor of the total number of nozzles used. For the sake of explanation, the print area for the vertically arranged 16 pixels are divided into eight 2-pixel areas, area 11 to area 18.

The printing for the area 11 is completed in two scans of a first and a second scan in each of which printing is performed with the ½ duty. A so-called 2-pass printing is performed in respective two scans. The area 12 is printed in a 3-pass printing in which a total of three scans of the first scan with the ¼ duty, the second scan with the ½ duty and a third scan with the ¼ duty is performed to complete the area 12. Similarly, the area 13 is completed by a 2-pass printing that performs the respective ½ duty of the second and third scans; the area 14 is completed by a 3-pass printing which consists of second, third and fourth scans; and the area 15 is completed by a 2-pass printing which performs third and fourth scans. As can be seen from the above explanation, each of the areas 11–18 is an area whose printing is successively completed every scan and, of a plurality of scans (2 or 3 scans) performed in each area, the scans which use the end nozzle group a1 or c1 are set to have a small printing duty.

Figure 1C:
FIGS. 1A, 1B and 1C are diagrams explaining a printed state in which density variations occur.
Figure 1B:
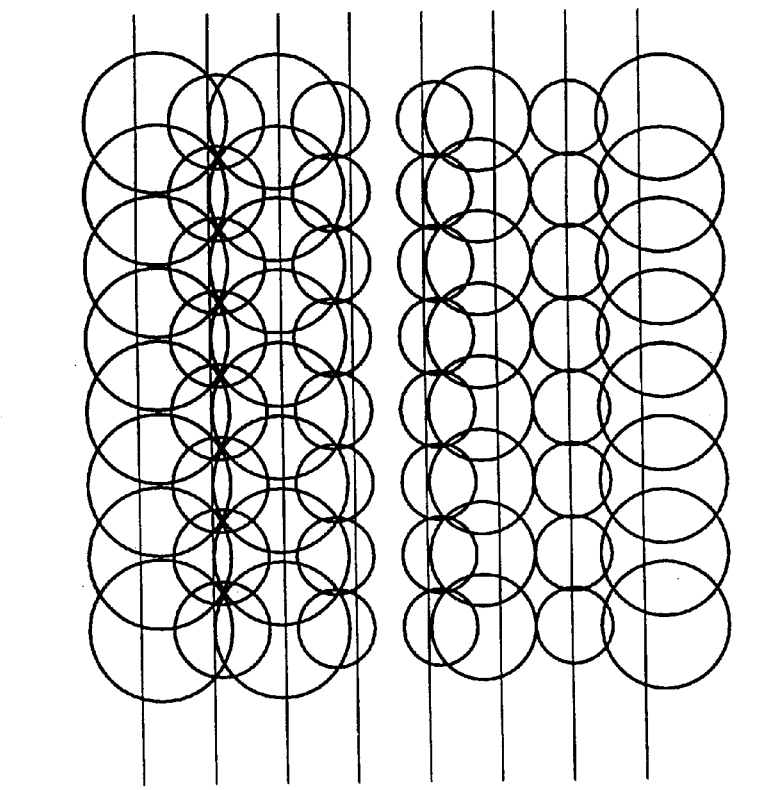
Figure 1A:
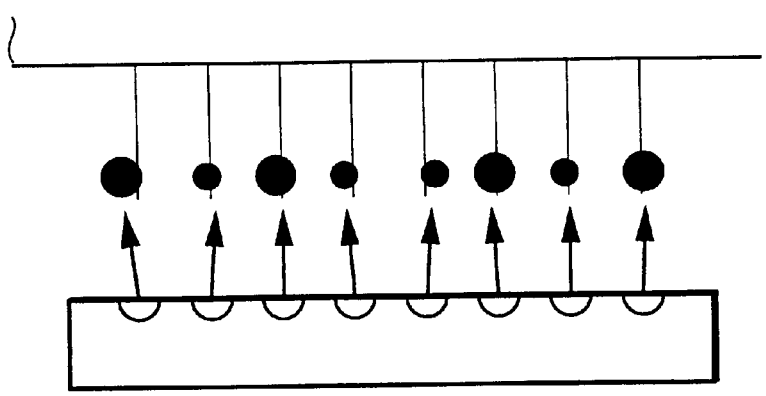
Figure 3A:
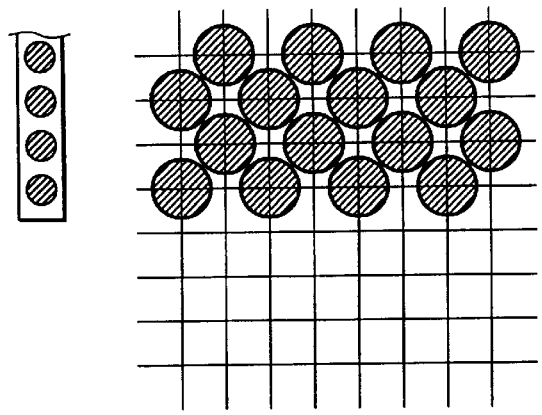
FIGS. 3A, 3B and 3C are diagrams explaining a process of the multipass printing.
Figure 3B:
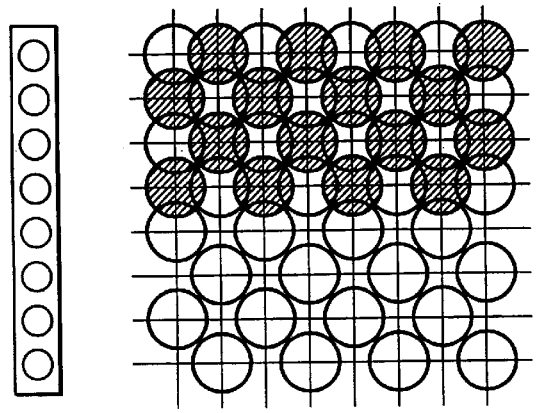
Figure 3C:
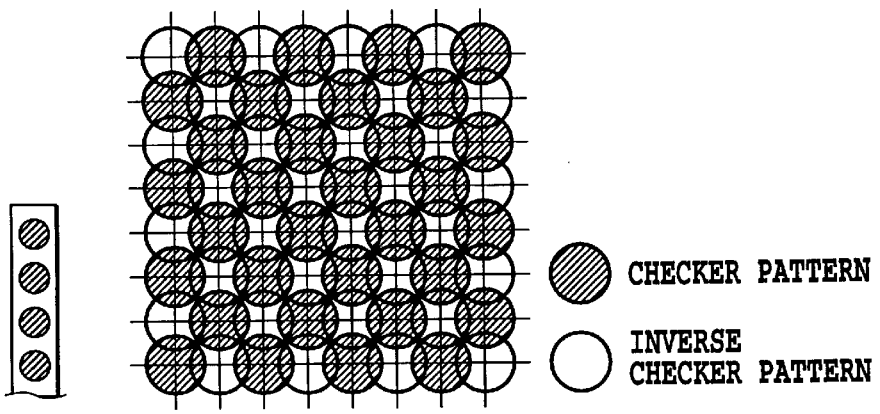
Figure 4A:
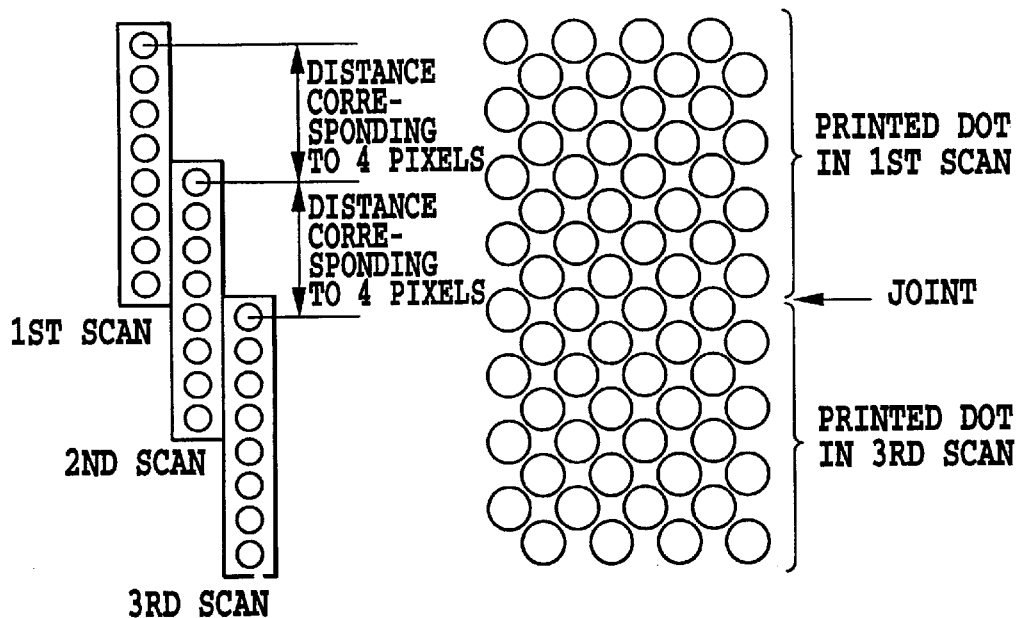
FIGS. 4A and 4B are diagrams explaining how a boundary stripe is formed owing to a disagreement between a paper feed amount and a nozzle pitch.
Figure 4B:
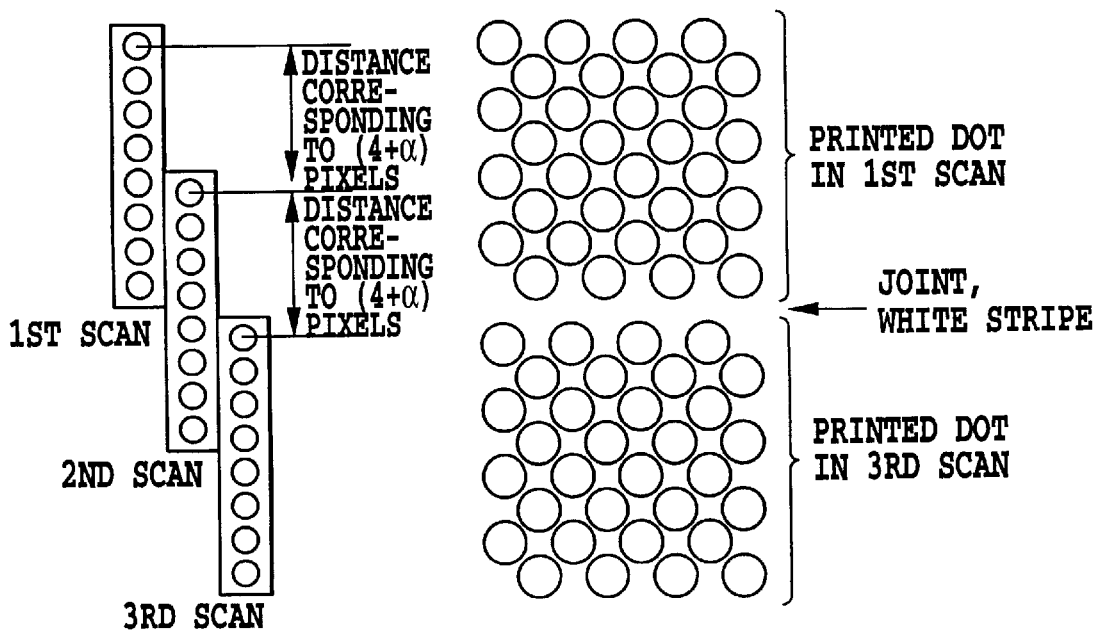
Figure 5:
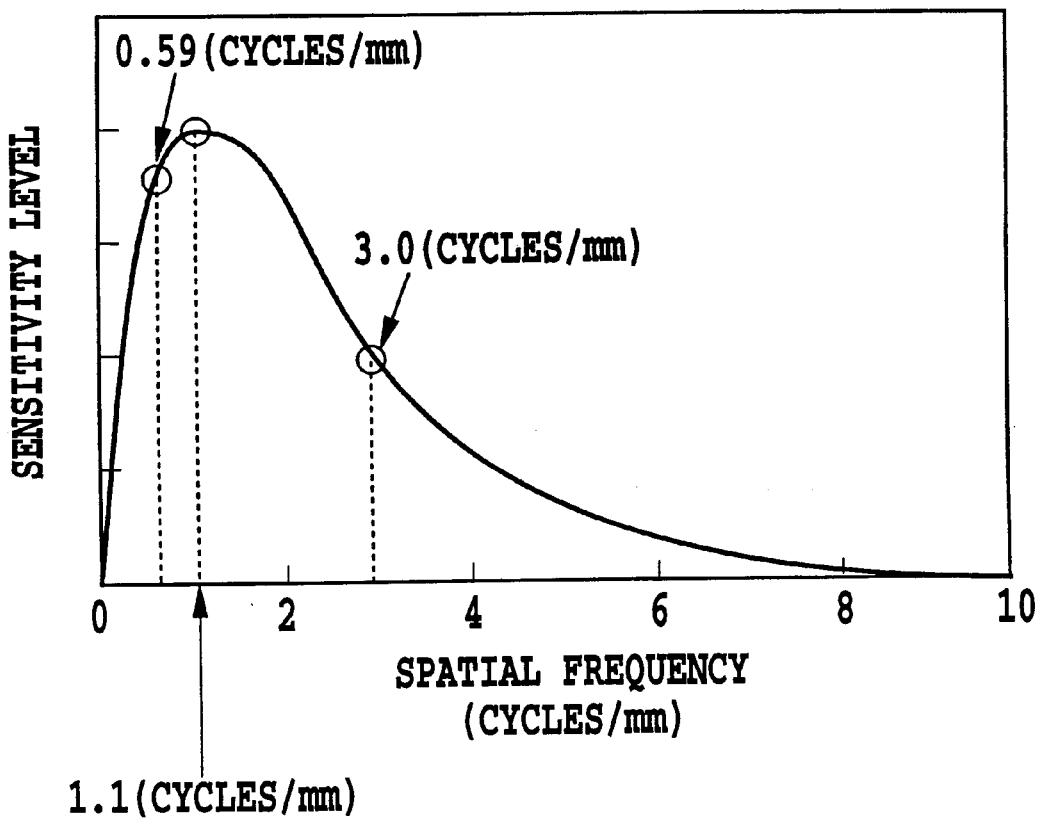
FIG. 5 is a graph showing a spatial frequency characteristic of the human eye.

Further, as is seen from FIG. 9B, in the printing method of this embodiment the end portion of an area printed by each scan does not adjoin the end portion of areas printed by other scans. That is, in the conventional multipass printing method, for example in the 2-pass printing shown in FIGS. 4A and 4B, the lower end portion of a scan area printed by the first scan adjoins the upper end portion of the scan area printed by the third scan. Hence, even a slight paper feed error will likely to cause the end portions to separate from each other (producing a white stripe) or to overlap each other (producing a dark stripe) at the joint or the boundary. On the other hand, with the method of this embodiment, since the end portions of the scan areas do not adjoin with each other, the paper feed error, if any, will not cause the end portion separation or overlapping phenomenon itself, thereby suppressing the occurrence of the stripe.

Since the 2-nozzle-width end area in each scan area has a reduced printing duty, the end area printed by one scan has a lower density. As a result, if the scan areas deviate in position among the scans due to the paper feed errors or if the density of each scan area differs due to printing time differences among the scans, the influences of these errors or differences are less likely to appear as density variations such as the stripes at the joints.

Further, in the conventional multipass printing, the stripes may be produced depending on the paper feed width. In this embodiment, while the paper feed width is 4 nozzle width, the interval of the end portion of each scan area where the boundary stripe may occur is set to a 2-nozzle width so that the end portions of the print areas do not adjoin each other. Thereby, if the boundary stripe should occur, the interval of stripe occurrence can be made further shorter than the paper feed amount. Thus, the stripes are made less conspicuous without causing a reduction in throughput.

Figure 10:
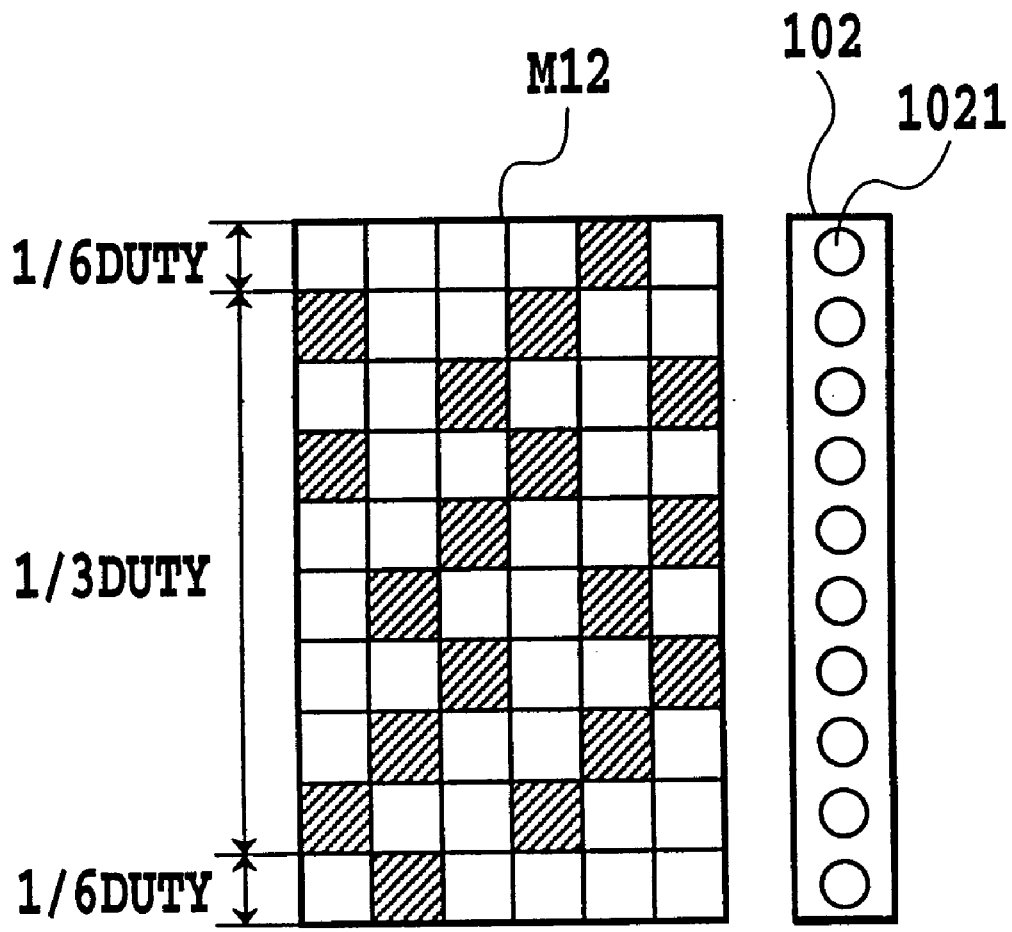
FIG. 10 is an explanatory diagram showing another example the mask that can be used in the first embodiment.

In the above example, the 2-pass and 3-pass printing have been shown to be performed by feeding the paper about half the total nozzle width. A further improvement of print quality can be accomplished by increasing the number of passes. FIG. 10 shows an example of the mask when the number of passes is increased. A mask M12, as similar to the above example, is used for a print head with 10 nozzles and corresponds in size to a pixel array, 10 vertically arranged pixels by 6 horizontally arranged pixels. In the figure, the portions shown in gray are those that make the image data valid. The mask M12, as in the above example, is divided into three areas, and upper and lower 1-nozzle areas each have a ⅙ printing duty in which one out of six pixels of data is made valid. A central 8-nozzle area has a ⅓ duty in which 16 out of 48 pixels of data are made valid. When this mask is used and the paper feed is set to a 3-nozzle width, each area is completely printed in three or four scans.

It should be noted that the shape and size of the mask are not limited to the above example. It is effective for improving the print quality to use a mask of an even greater size and to provide the effective area of the mask with randomness. In any case, a plurality of nozzles of the print head are divided into nozzle groups including a predetermined number of adjacent nozzles; different nozzle groups are provided with different printing duties, particularly with the printing duties of the end nozzle groups that constitute print boundary portions set to a small value; and the paper feed is set to a nozzle width not equal to a divisor of the total number of printing nozzles. This arrangement produces the effect of this embodiment, that is, the end portions of the printing areas are prevented from adjoining each other, as would normally occur in the conventional printing and constitute a major cause of the boundary stripes. As a result, the boundary stripes become less likely to be produced and, even if they occur, the density of the stripes is reduced and the interval of the stripes becomes short. This makes the stripes less conspicuous, realizing improved print quality without substantial reduction in throughput.

(Embodiment 2)

In the embodiment 1, a plurality of nozzles of the print head are divided into some nozzle groups, the printing duties of the end nozzle groups are set small, and the paper feed amount is set to a nozzle width not equal to a divisor of the total number of nozzles used in the print head, in order to make less likely the occurrence of the boundary stripes or make the stripes less conspicuous. However, it is already shown that the reduction in the printing duty of the end nozzle groups alone can make the boundary stripes less conspicuous. A second embodiment of the present invention describes this example.

Figure 11A:
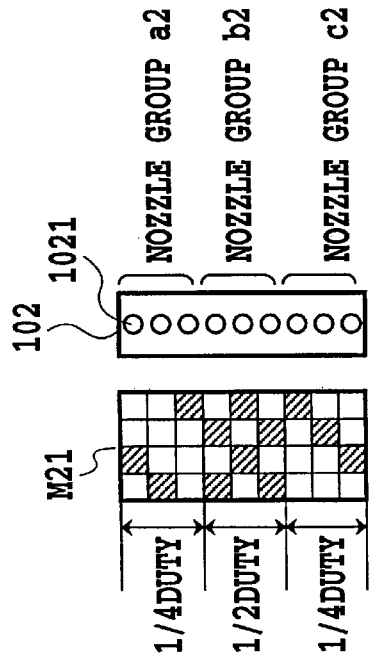
FIGS. 11A and 11B are explanatory diagrams showing masks used in the multipass printing according to a second embodiment of the present invention and process in which the multipass printing is completed.
Figure 11B:
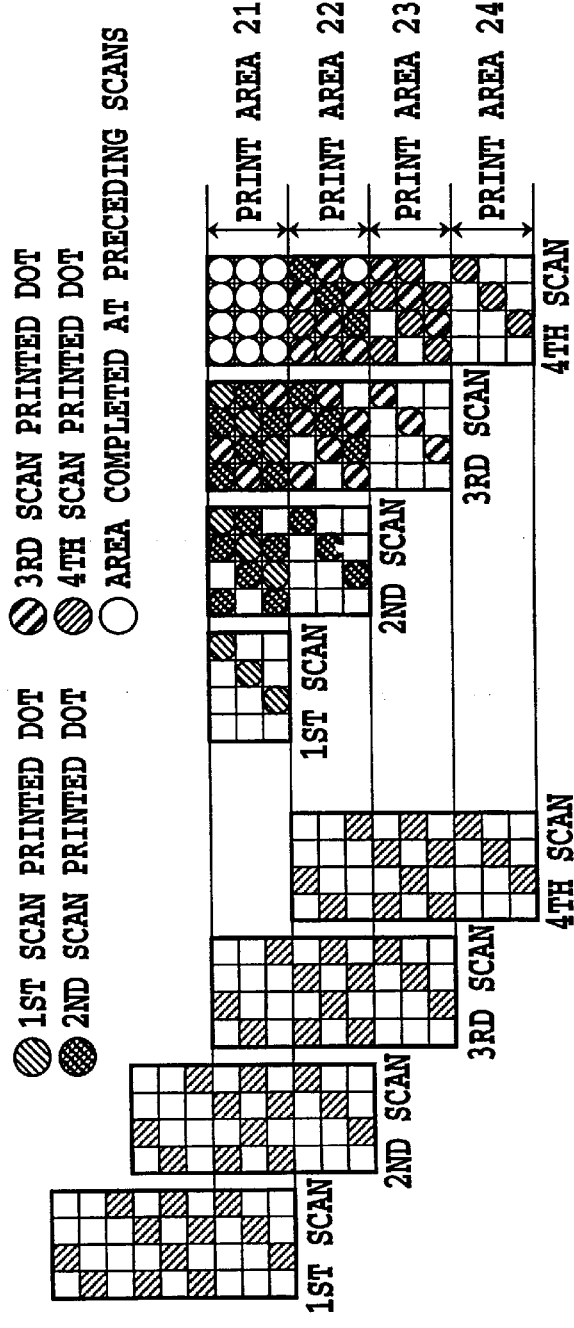

FIGS. 11A and 11B are explanatory diagrams showing a process of multipass printing that uses a thinning mask in the second embodiment of the present invention.

FIG. 11A schematically shows a print head with nine nozzles and a mask M21 used to generate ejection data for the head. The mask M21 corresponds in size to a pixel array, 9 vertically arranged pixels by 4 horizontally arranged pixels of image data, and the portions shown in gray in the figure are those that make the image data valid. As already described, the mask M21 is repetitively used in a 4-pixel interval in the scan direction of the image data. Nine nozzles are divided into three nozzle groups (nozzle groups a2, b2, c2) and the mask M21 for these nozzles is also divided into three areas as shown in the figure so that the divided areas complement each other with respect to the mask processing. Areas of the mask corresponding to the nozzle groups a2 and c2 make valid three out of 12 pixels of image data, which means the printing duty is a ¼ duty. An area of the mask corresponding to the central three nozzles in the nozzle group b2 makes 6 out of 12 of image data valid, which represents a ½ duty. As in the embodiment 1, the same mask portions always correspond to the same nozzles in each scan. The mask pattern for the nozzle group a2, the mask pattern for the nozzle group b2, and the mask pattern for the nozzle group c2 are complementary to each other.

FIG. 11B shows the process of the printing using the print head and mask shown in FIG. 11A. In this embodiment, the paper feed amount is a 3-nozzle width. As a result, different from the first embodiment, the end portions of scan areas covered by different scans adjoin each other. In the example of FIG. 11B, the lower end portion of the scan area of the first scan adjoins the upper end portion of the scan area of the fourth scan. As a result, it is not possible to suppress the occurrence of the boundary stripes themselves and to shorten the intervals of the stripes. However, as described below, by reducing the printing duties of the end nozzle groups, the density of the boundary stripes, should they occur, can be lowered, making the stripes less conspicuous.

More specifically, a print area is divided by vertical 3-pixel to become areas 21–24. The printing of the area 21 is completed in three scans, which are the ¼ printing duty of the first scan, the ½ duty of the second scan and the ¼ duty of the third scan. The area 22 is printed by performing the ¼ duty of the second scan, the ½ duty of the third scan and the ¼ duty of the fourth scan. In the similar way, all the areas are each completed in three scans.

With the printing method of this embodiment, there is a possibility that the upper end portion and the lower end portion of the scan area covered by each scan may adjoin the lower end portion and the upper end portion of a scan area printed by other scans, respectively to produce the boundary stripes. Because the duty of each scan with the nozzle group that prints these scan areas including the upper and lower end portions is set low, the density of the boundary stripes, if they should occur, can be reduced, making the boundary stripes less conspicuous.

(Embodiment 3)

The embodiments 1 and 2 have shown example cases in which one kind of the thinning mask is set, the same mask is used for every scan and the paper feed amount is constant. In a third embodiment, an example is shown which uses different masks and different feed widths for different scans.

Figure 12A:
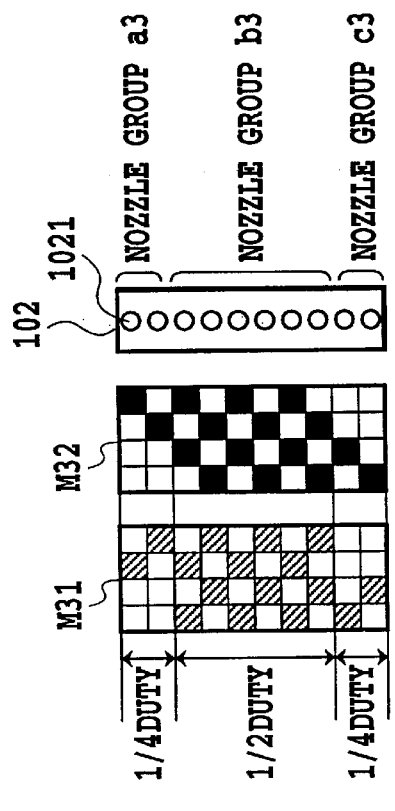
FIGS. 12A and 12B are explanatory diagrams showing masks used in the multipass printing according to a third embodiment of the present invention and a process in which the multipass printing is completed.
Figure 12B:
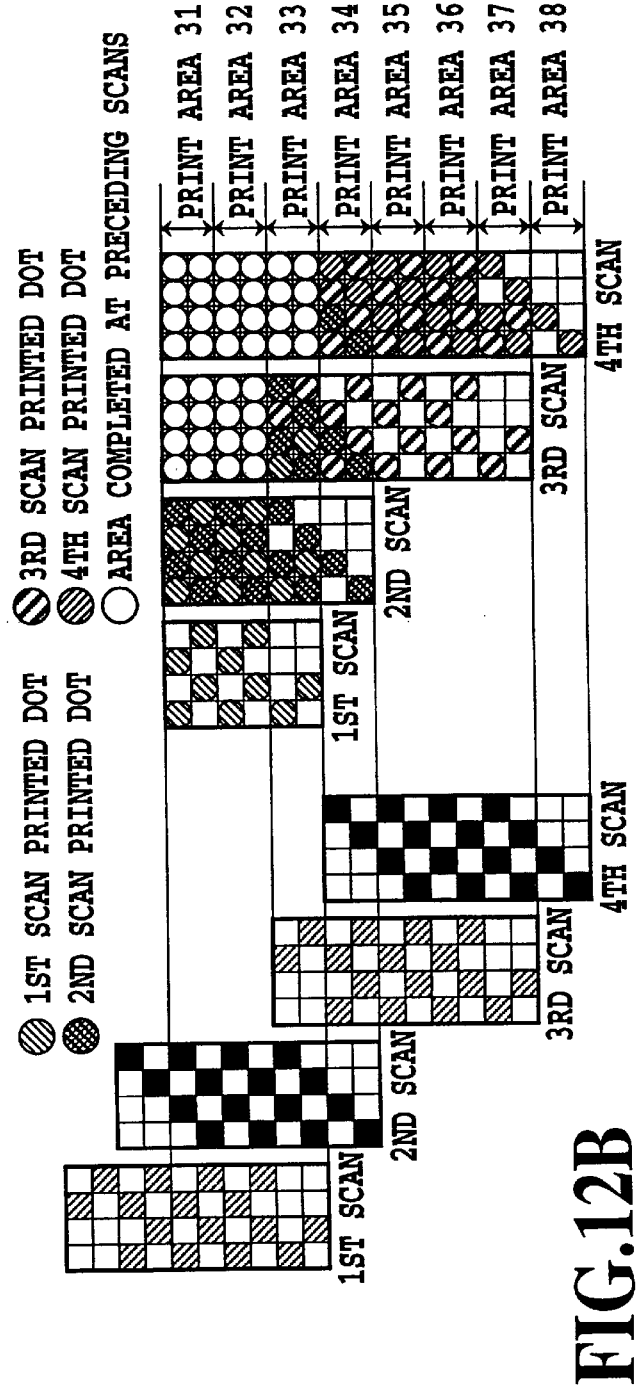

FIGS. 12A and 12B are explanatory diagrams showing a process of printing using a thinning mask according to this embodiment.

FIG. 12A shows schematically a print head with 10 nozzles, as in the embodiment 1, and two kinds of masks M31 and M32 for the image data supplied to the print head. The masks M31 and M32 each correspond in size to a pixel array, 10 vertically arranged pixels by 4 horizontally arranged pixels of image data, and the portions shown in gray in the figure are those that make the image data valid. These masks, as in the preceding embodiments, are repetitively used for the image data in the scan direction. The 10 nozzles are divided into three nozzle groups (nozzle groups a3, b3, c3) and the masks M31 and M32 are also divided into three areas as shown. Upper and lower 2-nozzle mask areas that correspond to the nozzle group a3 and nozzle group c3, respectively make valid two out of eight pixels of image data, which represents a ¼ printing duty. A central 6-nozzle mask area corresponding to the nozzle group b3 makes 12 out of 24 pixels of image data valid, which represents a ½ printing duty.

FIG. 12B shows the process of printing using the print head and the masks M31, M32 shown in FIG. 12A. As shown in FIG. 12B, the mask M31 is used for an odd-numbered scan and the mask M32 is used for an even-numbered scan. The paper feed amount is set to be a 2-nozzle width after the odd-numbered scan printing and a 6-nozzle width after the even-numbered scan printing. In the figure, the print area is divided vertically into respective 2-pixel areas 31–38. The areas 31 and 32 are printed in two scans of a 2-pass printing that performs the respective ½ duty of the first and second scans. The area 33 is printed in a total of three scans of a 3-pass printing that performs the ¼ duty of the first scan, the ½ duty of the second scan and the ¼ duty of the third scan. Similarly, the area 34 is printed by a 3-pass printing consisting of the second, the third and a fourth scans. The areas 35 and 36 are printed by a 2-pass printing consisting of the third and the fourth scans. It is needless to say that the masks M31 and M32 have complementary patterns so that there is no loss of image data in each print area covered by the plurality of scans.

The printing method of this embodiment has the advantage of being able to make the boundary stripes less conspicuous because the printing duty of the nozzle groups corresponding to the end portions of the scan area is lowered. Further, by changing the paper feed amount for each scan, the interval of the stripes, if they should occur, can be shortened making the boundary stripes less conspicuous.

While this example has described a method which sets both the mask and the paper feed for each scan, it is possible to set only the mask for each scan, with the paper feed amount kept constant. Alternatively, only one mask may be used and the paper feed amount set for each scan. In either case, the only requirement is that the mask and the paper feed amount should be set so that the scan areas covered by the masks are complementary to one another and that the boundary stripes can be reduced.

(Embodiment 4)

In the above embodiments 1, 2 and 3, the printing methods have been described in which the printing duties for the central nozzle group and the end nozzle groups of the print head are differentiated to make the boundary stripes less conspicuous. A fourth embodiment describes a printing method in which an attention is paid to an occurrence interval of the boundary stripes and the boundary stripes are made less conspicuous by producing the stripes at small intervals at which the stripes are not easily recognized by the human eye.

Figure 13A:
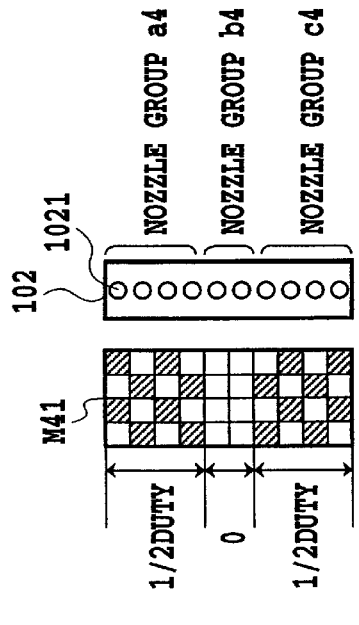
FIGS. 13A and 13B are explanatory diagrams showing masks used in the multipass printing according to a fourth embodiment of the present invention and a process in which the multipass printing is completed.
Figure 13B:
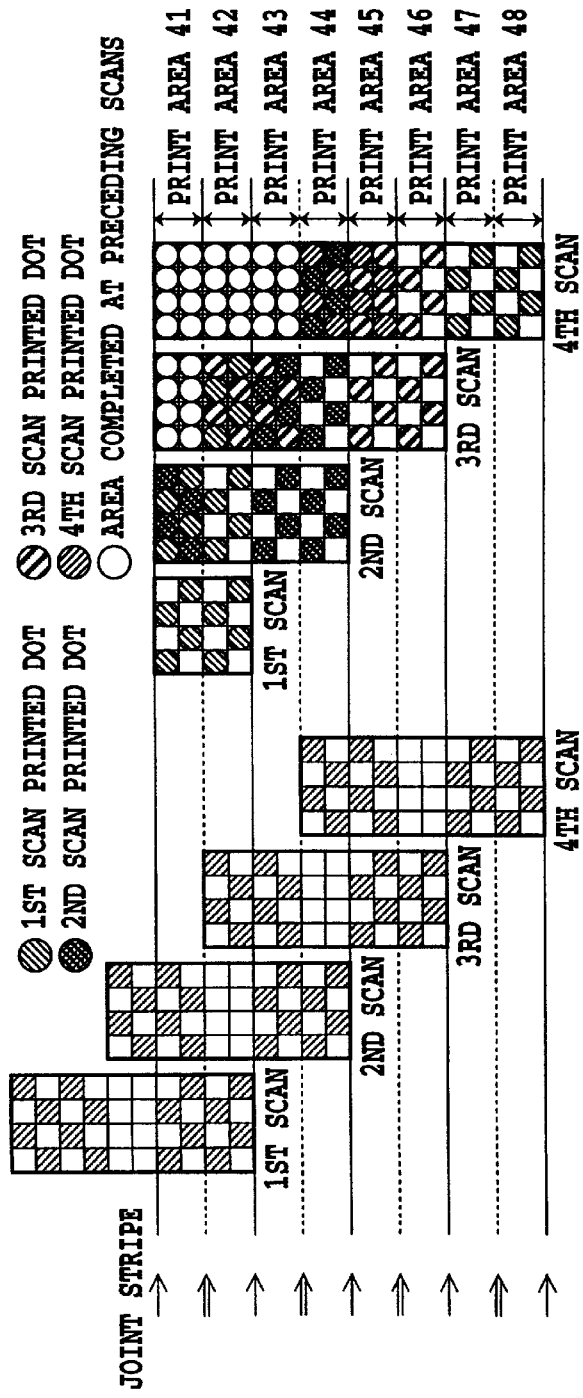

FIGS. 13A and 13B are explanatory diagrams showing a process of printing using a thinning mask according to the fourth embodiment.

FIG. 13A schematically shows a print head with 10 nozzles, as in the embodiment 1, and a mask M41 used to generate ejection data for the print head. The mask M41 corresponds in size to a pixel array, 10 vertically arranged pixels by 4 horizontally arranged pixels of image data, and the portions shown in gray in the figure are those that render the image data valid. This mask, as in the preceding embodiments, is repetitively used for the image data in the scan direction. The print nozzles are divided into three groups as shown. An upper four nozzles are grouped as a nozzle group a4, and the mask for the nozzle group a4 has a checker pattern that renders 8 out of 16 pixels valid, which represents a ½ duty. A lower four nozzles are grouped as a nozzle group c4. The mask for the nozzle group c4 has an inverse checker pattern which has a ½ duty. Central two nozzles are grouped as a nozzle group b4, and the mask for this nozzle group b4 has a 0% duty, which means that this nozzle group does not print. In each scan, the same mask portions always correspond to the same nozzles.

FIG. 13B shows a process of printing when the print head and the mask M41 shown in FIG. 13A are used. As in the preceding embodiments, it is assumed that a final image to be printed is a solid rectangle (100% duty) in which all pixels arranged in an array, 4 or more horizontal dots by 16 or more vertical dots, are printed. The paper feed amount is a 4-nozzle width. For the sake of explanation, the print area is divided vertically into respective 2-pixel print areas 41–48.

The area 41 is completed in two scans of a 2-pass printing that performs respective ½ duty of a first and a second scan. The area 42 is printed by a 2-pass printing, as in the case of the area 41, which performs printing in two scans out of three, with a ½ duty in the first and a third scan. Similarly, the area 43, the area 44, the area 45, . . . are successively completed with two passes.

Positions where the boundary stripes are likely to be produced are indicated by arrows at the left in FIG. 13B. In the figure, at the joints between the first and the second scan, between the second and the third scan, between the third and the fourth scan, and so forth, the end portions of the nozzle groups a4 and c4 adjoin each other to be possible to produce the stripes, as in the conventional printing method. In this case, the interval of the boundary stripes is equal to that of the paper feed amount (in this example, a four-nozzle width). In this embodiment, however, since the nozzles used in the head are limited (the nozzle group b4 is not used), the boundary stripe produced by the nozzle group a4 (at position indicated by a double-line arrow in the figure) and the boundary stripe produced by the nozzle group c4 (at a position indicated by a single-line arrow) deviate from each other by a two-nozzle width. As a result, with the paper feed amount left at the 4-nozzle width, the boundary stripes on the printed image appear at 2-nozzle intervals, rendering the stripes finer or less conspicuous.

Figure 14:
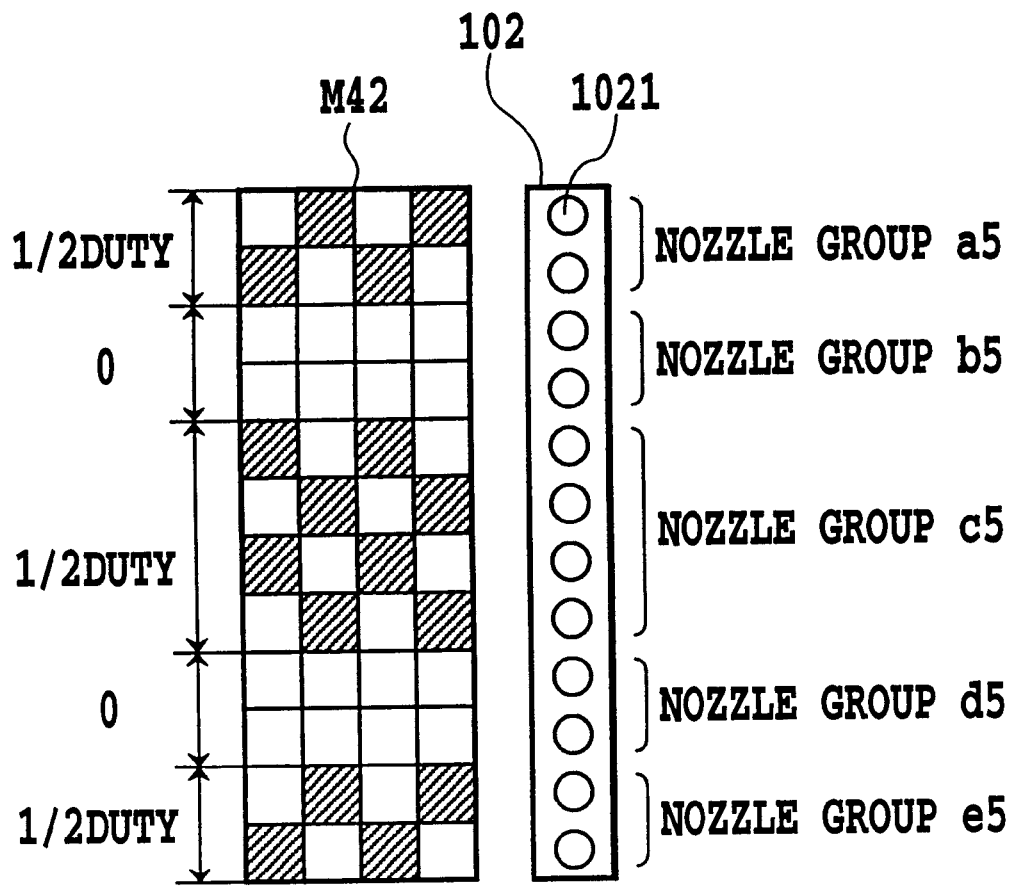
FIG. 14 is an explanatory diagram showing another example of the mask that can be used in the fourth embodiment.

It should be noted that the pattern of the thinning mask is not limited to the above example. The only requirement is that the pattern should produce the stripes at sufficiently short intervals to make them inconspicuous. It is also possible to divide the nozzles into a larger or smaller number of groups. For example, as shown in FIG. 14, the nozzles may be divided into five groups (nozzle groups a5–e5), of which the nozzle groups b5 and d5 are set not to make the image data valid (these nozzle groups are not used) and the nozzle groups a5, c5 and e5 are set with masks of a ½ duty. In that case, if the paper feed amount is set at a 4-nozzle width, the position where the boundary stripe is likely to be formed shifts, setting the stripe appearing cycle to a 2-nozzle width.

Further, providing the mask pattern with randomness is effective in making less conspicuous mechanical noise such as carriage deviations and head noise such as ink ejection direction variations. Further, while this embodiment has taken up a case that uses one kind of mask and a constant paper feed amount, it is also possible to change the mask for each scan or perform an irregular paper feed amount. Because this embodiment has nozzles not used for printing, a plurality of masks may be prepared and the mask changed for each scan to distribute the unused nozzles. This is effective for preventing deviations of the used nozzles and prolonging the life of the head. Further, it is also possible to prepare a plurality of kinds of masks which have different positions of nozzles not used for printing and to change the mask for each page. This also contributes to prolonging the life of the head. It is of course a necessary condition that whatever patterns may be used, they must complement each other so that there is no loss of data in the final printed image.

As described above, the nozzle groups other than the end nozzle groups in the print head can be removed from use for printing, so that the locations where the boundary stripes are formed are distributed to shorten the stripe intervals. This helps render the stripes inconspicuous, improving the quality of a printed image.

Although the foregoing embodiments concern the print head in the ink jet printing system, the present invention is not limited to this application but can be applied to other types of print head including the ones used in a heat transfer printing system and a thermosensitive printing system.

The present invention achieves distinct effect when applied to a printing head or a printing apparatus which has means for generating thermal energy such as electrothermal transducers or laser light, and which causes changes in ink by the thermal energy so as to eject ink. This is because such a system can achieve a high density and high resolution printing.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet printing systems, it is particularly suitable for the on-demand type apparatus. This is because the on-demand type apparatus has electro-thermal transducers, each disposed on a sheet or liquid passage that retains liquid (ink), and operates as follows: first, one or more drive signals are applied to the electrothermal transducers to cause thermal energy corresponding to printing information; second, the thermal energy induces sudden temperature rise that exceeds the nucleate boiling so as to cause the film boiling on heating portions of the printing head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better printing.

U.S. Pat. Nos. 4,558,333 and 4,459,600 disclose the following structure of a printing head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the printing head, the present invention can achieve printing positively and effectively.

In addition, the present invention can be applied to various serial type printing heads: a printing head fixed to the main assembly of a printing apparatus; a conveniently replaceable chip type printing head which, when loaded on the main assembly of a printing apparatus, is electrically connected to the main assembly, and is supplied with ink therefrom; and a cartridge type printing head integrally including an ink reservoir.

It is further preferable to add a recovery system, or a preliminary auxiliary system for a printing head as a constituent of the printing apparatus because they serve to make the effect of the present invention more reliable. Examples of the recovery system are a capping means and a cleaning means for the printing head, and a pressure or suction means for the printing head. Examples of the preliminary auxiliary system are a preliminary heating means utilizing electrothermal transducers or a combination of other heater elements and the electrothermal transducers, and a means for carrying out preliminary ejection of ink independently of the ejection for printing. These systems are effective for reliable printing.

The number and type of printing heads to be mounted on a printing apparatus can be also changed. For example, only one printing head corresponding to a single color ink, or a plurality of printing heads corresponding to a plurality of inks different in color or concentration can be used. In other words, the present invention can be effectively applied to an apparatus having at least one of the monochromatic, multi-color and full-color modes. Here, the monochromatic mode performs printing by using only one major color such as black. The multi-color mode carries out printing by using different color inks, and the full-color mode performs printing by color mixing.

Furthermore, although the above-described embodiments use liquid ink, inks that are liquid when the printing signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the printing medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the printing signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet printing apparatus of the present invention can be employed not only as an image output terminal of an information processing device such as a computer, but also as an output device of a copying machine including a reader, and as an output device of a facsimile apparatus having a transmission and receiving function.

According to the embodiments of the present invention, in printing respective areas whose printing operations are completed sequentially at every respective scan, although an end group of printing elements in the print head adjoins an area so as to print the area in a certain scan and therefore a boundary between the area and a adjacent area is defined during that scan, so that a boundary stripe is likely to occur, the mask processing is performed to reduce a printing duties for the area adjoining the boundary so that a density of the boundary stripe, even if it should occur, can be reduced. Further, a paper feed amount is set to a width not equal to a divisor of a printing width corresponding to a total number of the printing elements so that the end portions of the areas printed at each scan can be prevented from adjoining each other at the boundary. This can eliminate a major cause for the boundary stripes and, even if one end portion of the area results in the formation of the boundary stripe, it is possible to make the stripe occurrence interval smaller than the paper feed width.

Further, it is possible to make the boundary stripes themselves inconspicuous and make the intervals of the stripes smaller than the paper feed amount.

As a result, the stripes can be made inconspicuous and the quality of the printed image can therefore be improved while taking advantage of features of the multipass printing without causing a substantial reduction in a throughput of the printing apparatus.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for performing printing on a printing medium using a print head arrayed with a plurality of printing elements, said apparatus comprising:

scanning means for moving the print head and the printing medium relative to each other to scan the print head to the printing medium;

paper feed means for moving the print head and the printing medium relative to each other to feed the printing medium in a direction different from a scan direction of the print head;

multipass control means for controlling said scanning means and said paper feed means to scan the print head a plurality of times between which feeding of the printing medium by said paper feed means is performed, so that different printing elements of the print head are made to correspond to a same print area of the printing medium at the plurality times of scans to print the print area and printing for areas are completed successively for each scan of the plurality of scans; and mask means for performing mask processing to generate image data used for control of printing by said multipass control means, said mask processing being performed so that a printing duty for an end group of the printing elements in an arrangement of a plurality of groups of the printing elements, which are made to correspond to one of the areas of which printing is completed successively for each scan of said plurality of scans, is made smaller than that of other groups of said plurality of groups.

2. A printing apparatus as claimed in claim 1, wherein said mask means performs mask processing such that the plurality of scans performed on the one of the areas of which printing is completed successively for each scan complement each other in printing said one of the areas.

3. A printing apparatus as claimed in claim 1, wherein a feed amount at which the printing medium is fed by said paper feed means is an amount not equal to a divisor of a printing width covered by a total number of printing elements of the print head.

4. A printing apparatus as claimed in claim 3, wherein said multipass control means controls said paper feed means to change, for each scan of the print head, the feed amount of the printing medium.

5. A printing apparatus for performing printing on a printing medium using a print head arrayed with a plurality of printing elements, said apparatus comprising:

scanning means for moving the print head and the printing medium relative to each other to scan the print head to the printing medium;

paper feed means for moving the print head and the printing medium relative to each other to feed the printing medium in a direction different from a scan direction of the print head;

multipass control means for controlling said scanning means and said paper feed means to scan the print head a plurality of times between which feeding of the printing medium by said paper feed means is performed, so that different printing elements of the print head are made to correspond to a same print area of the printing medium at the plurality times of scans to print the print area and printing for areas are completed successively for each scan of the plurality of scans; and mask means for performing mask processing to generate image data used for control of printing by said multipass control means, said mask processing being performed so that a printing duty for a part of a group of the printing elements other than an end group in an arrangement of a plurality of groups of the printing elements, which are made to correspond to one of the areas of which printing is completed successively for each scan of said plurality of scans, is made zero.

6. A printing apparatus as claimed in claim 5, wherein said mask means performs mask processing such that the plurality of scans performed on the one of the areas of which printing is completed successively for each scan complement each other in printing said one of the areas.

7. A printing apparatus as claimed in claim 1, wherein each of the plurality of printing elements in the print head utilizes thermal energy to generate bubbles in an ink and eject the ink by the pressure of the bubbles.

8. A printing method of performing printing on a printing medium using a print head arrayed with a plurality of printing elements, said method comprising the steps of:

providing scanning means for moving the print head and the printing medium relative to each other to scan the print head to the printing medium, and paper feed means for moving the print head and the printing medium relative to each other to feed the printing medium in a direction different from a scan direction of the print head;

controlling said scanning means and said paper feed means to scan the print head a plurality of times between which feeding of the printing medium by said paper feed means is performed, so that different printing elements of the print head are made to correspond to a same print area of the printing medium at the plurality times of scans to print the print area and printing for areas are completed successively for each scan of the plurality of scans; and performing mask processing to generate image data used for control of printing in said step for controlling said scanning means and said paper feed means, said mask processing being performed so that a printing duty for an end group of the printing elements in an arrangement of a plurality of groups of the printing elements, which are made to correspond to one of the areas of which printing is completed successively for each scan of said plurality of scans, is made smaller than that of other groups of said plurality of groups.

9. A printing method as claimed in claim 8, wherein said step for performing mask processing performs the mask processing such that the plurality of scans performed on the one of the areas of which printing is completed successively for each scan complement each other in printing said one of the area.

10. A printing method as claimed in claim 8, wherein a feed amount at which the printing medium is fed by said paper feed means is an amount not equal to a divisor of a printing width covered by a total number of printing elements of the print head.

11. A printing method as claimed in claim 10, wherein said step for controlling said scanning means and said paper feed means controls said paper feed means to change, for each scan of the print head, the feed amount of the printing medium.

12. A printing method of performing printing on a printing medium using a print head arrayed with a plurality of printing elements, said method comprising the steps of:

provoking scanning means for moving the print head and the printing medium relative to each other to scan the print head to the printing medium, and paper feed means for moving the print head and the printing medium relative to each other to feed the printing medium in a direction different from a scan direction of the print head;

controlling said scanning means and said paper feed means to scan the print head a plurality of times between which feeding of the printing medium by said paper feed means is performed, so that different printing elements of the print head are made to correspond to a same print area of the printing medium at the plurality times of scans to print the print area and printing for areas are completed successively for each scan of the plurality of scans; and performing mask processing to generate image data used for control of printing in said step for controlling said scanning means and said paper feed means, said mask processing being performed so that a printing duty for a part of a group of the printing elements other than an end group in an arrangement of a plurality of groups of the printing elements, which are made to correspond to one of the areas of which printing is completed successively for each scan of said plurality of scans, is made zero.

13. A printing method as claimed in claim 12, wherein said step for performing mask processing performs the mask processing such that the plurality of scans performed on the one of the areas of which printing is completed successively for each scan complement each other in printing said one of the areas.

* * * * *

UNITED STATES PATENT AND TRADEMARK OFFICE
CERTIFICATE OF CORRECTION

PATENT NO.    : 6,206,502 B1
DATED         : March 27, 2001
INVENTOR(S)   : Kato et al.

It is certified that error appears in the above-identified patent and that said Letters Patent is hereby corrected as shown below:

Column 1,
Line 18, "employs" should read -- employ --.
Line 38, "to" should read -- to as --.
Line 40, "to" should read -- to as --.

Column 2,
Line 41, "pixels" should read -- pixel --.
Line 66, "numbers" should read -- number --.

Column 4,
Line 52, "features" should read -- feature --.

Column 5,
Line 61, "a adjacent" should read -- an adjacent --.

Column 6,
Lines 53 and 64, "made" should read -- made to --.

Column 9,
Line 5, "bellow." should read -- below. --.
Line 17, "1 nozzles" should read -- 10 nozzles --.

Column 11,
Line 53, "12" should read -- 12 pixels --.

Column 16,
Line 49, "a" should read -- an --.
Line 51, "a printing" should read -- printing --.

UNITED STATES PATENT AND TRADEMARK OFFICE
CERTIFICATE OF CORRECTION

PATENT NO. : 6,206,502 B1
DATED : March 27, 2001
INVENTOR(S) : Kato et al.

It is certified that error appears in the above-identified patent and that said Letters Patent is hereby corrected as shown below:

<u>Column 18,</u>
Line 60, "area." should read -- areas --.

Signed and Sealed this

Eleventh Day of November, 2003

JAMES E. ROGAN
*Director of the United States Patent and Trademark Office*